Figure 1:
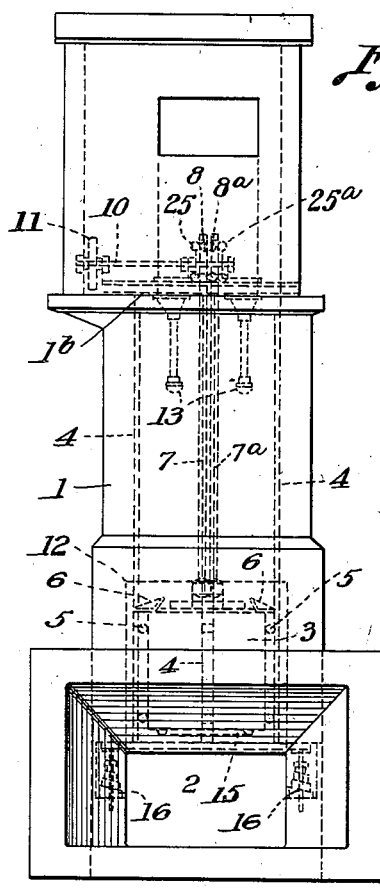
Figure 2:
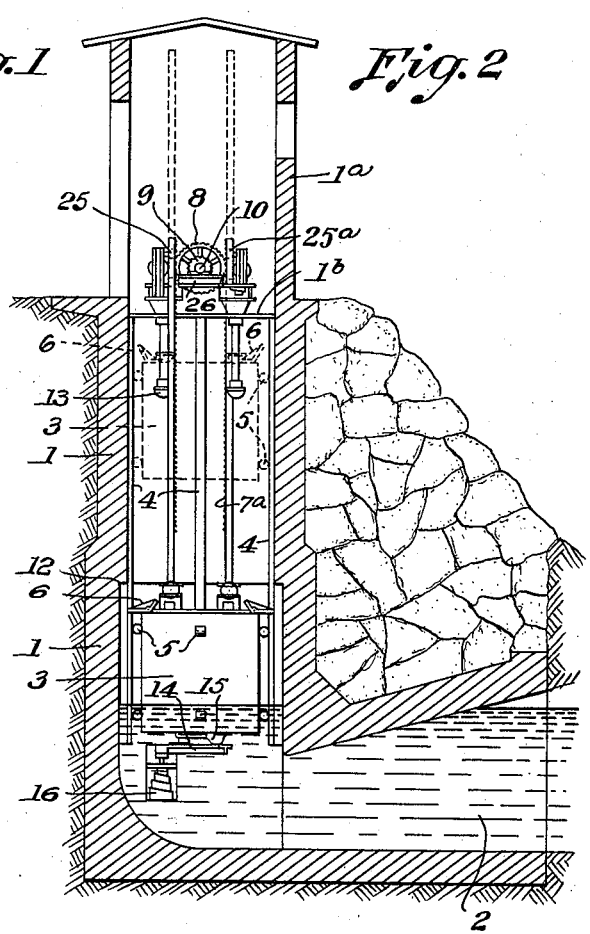
Figure 3:
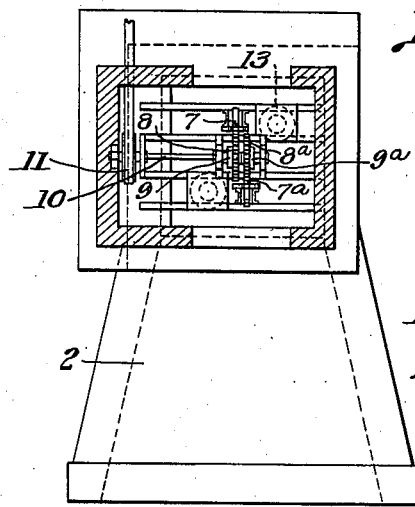
Figure 4:
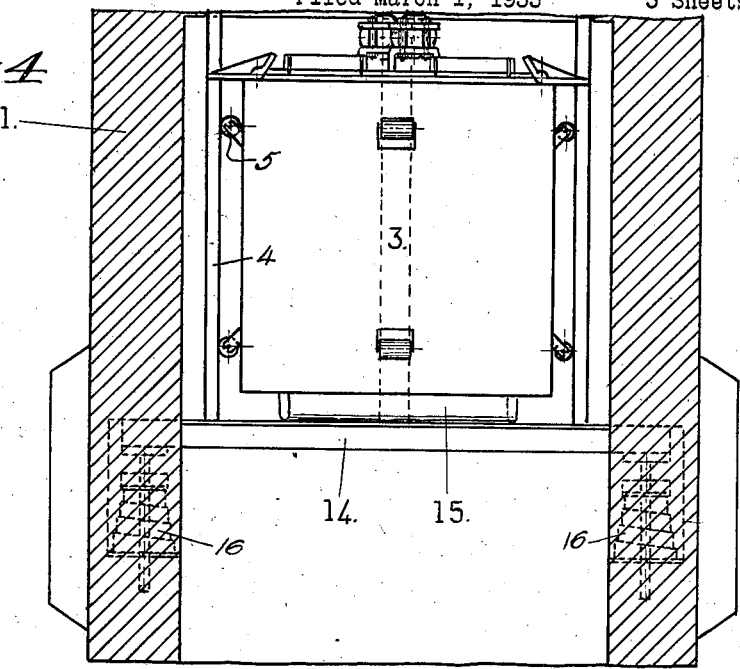
Figure 4A:
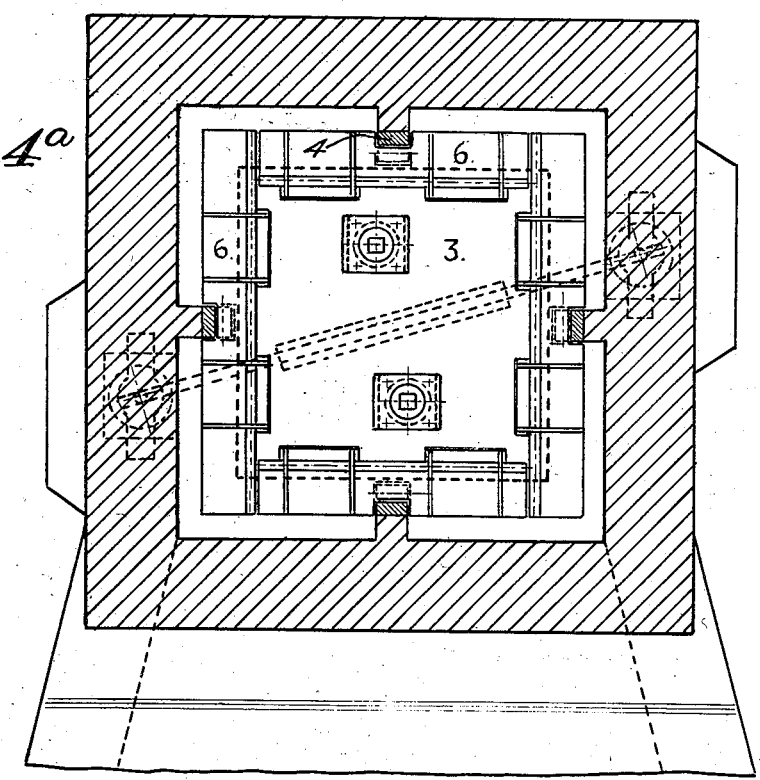
Figure 5:
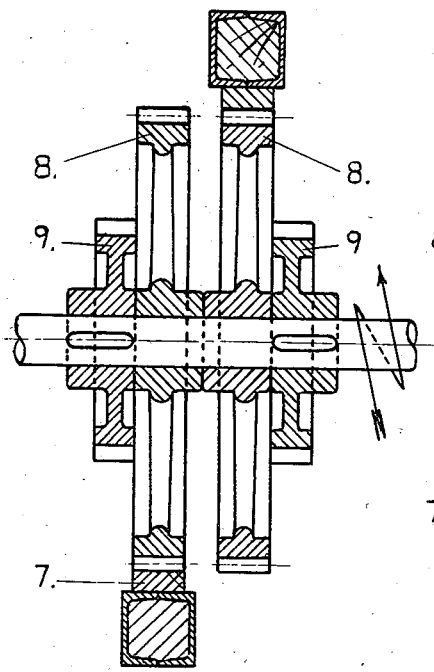
Figure 5A:
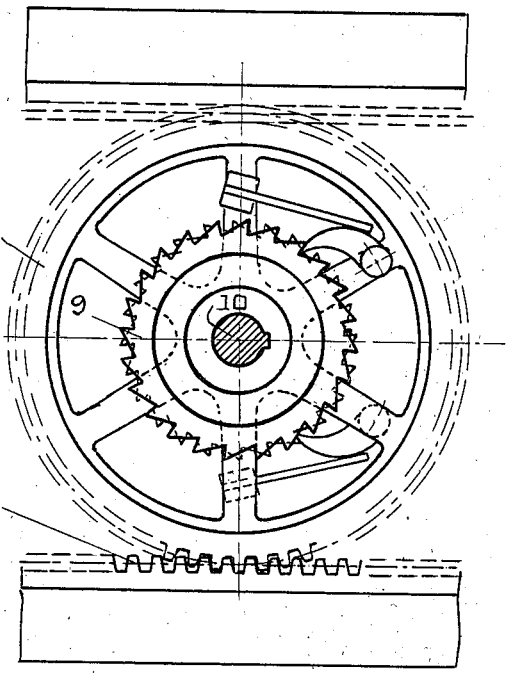
Figure 6:
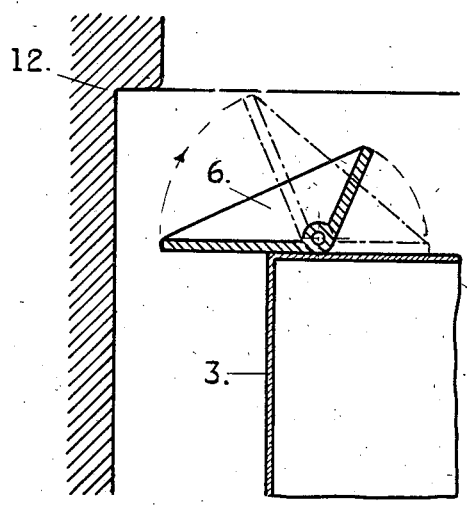
Figure 7:
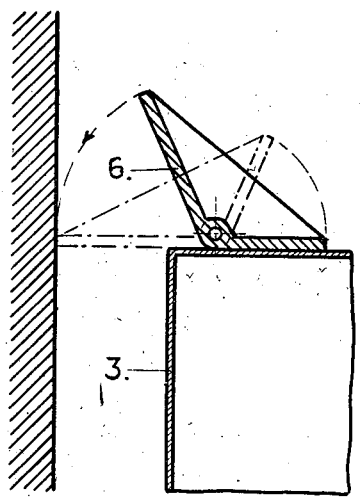

Sept. 10, 1935.  A. PUIGJANER  2,013,861
WAVE MOTOR
Filed March 1, 1933   3 Sheets-Sheet 1

Inventor:
Alberto Puigjaner.
By Ferd. M Mael,
Attorney.

Sept. 10, 1935.  A. PUIGJANER  2,013,861

WAVE MOTOR

Filed March 1, 1933  3 Sheets-Sheet 3

Patented Sept. 10, 1935

2,013,861

UNITED STATES PATENT OFFICE 2,013,861

WAVE MOTOR

Alberto Puigjaner, Barcelona, Spain

Application March 1, 1933, Serial No. 659,027
In Spain April 25, 1932

3 Claims. (Cl. 253—10)

This invention refers to an apparatus or industrial appliance to use the energy of the sea waves as motive power, converting their natural rise and fall into power in a manner entirely independent of any tidal changes, the resulting energy being led to an accumulating apparatus which supplies it at a continuous and regulated velocity to serve industrial purposes.

The industrial object of the invention is the use of the energy produced by the sea in its rise and fall, by means of an apparatus or appliance scientifically arranged to capture this energy, transforming it mechanically so that it may be changed into motive power for industrial purposes.

Fig. I shows the apparatus in front elevation.

Fig. II is a vertical section taken at right angles to Fig. I.

Fig. III is a cross section through the upper end of the hydraulic chamber of Fig. I showing the transmission gearing in top plan view.

Fig. IV is a part vertical section showing the float.

Fig. IVa is a top plan view of Fig. IV.

Fig. V is a cross section of the transmission gearing.

Fig. Va is a side elevation of Fig. V.

Figs. VI and VII show in two different positions one of the automatic hinged fan valves on the top of the float.

The apparatus in question in its entirety is represented in the Figures I, II and III, which show the appliance in elevation seen from the outside, from the inside, and from above.

In the accompanying drawings can be seen the hydraulic chamber 1 into which the sea water enters, and out of which it goes in the course of its rise and fall, passing through a big rectangular culvert 2 made in the shape of a truncated cone which grows less and less in size until it coincides with the interior width of the chamber 1. In this chamber there is a float 3, the dimensions of which are in proportion with the size and power capacity of each installation. This float is square, and it is held in place by four guides 4 which allow it to ascend and descend as a result of the pressure of the sea water when it enters and leaves the chamber 1. This displacement of the float 3 is effected with a minimum of friction due to the use of roller bearings 5, placed at its four sides as seen in the respective drawings Figs. I, II and IV, the rollers of these bearings running on the guides 4. These roller bearings facilitate the movement of the float in question, both when it rises and when it descends, so that friction losses are reduced, thus producing a greater utilization of wave power.

The float 3 is provided on its top with automatic hinged fan valves 6, as shown in Figs. II, IV, VI and VII, the purpose of which is to maintain or hold water on top of the float when it rises, so that the weight increases the force of the downward stroke. In the description of the working of the invention this phenomenon is perfectly demonstrated.

Racks 7, 7a arranged in different vertical planes extend upwardly from the top of the float 3 through a partition 1b in the chamber and these racks mesh with gears 8 and 8a respectively loosely mounted on a shaft 10 (Figs. II and V) of a transmission gearing journalled in a frame 26 mounted on the partition 1b in the upper portion 1a of the chamber 1. These racks are of a length in accordance with the dimensions of the float and its maximum travel and are guided by rollers 25 and 25a mounted on the frame 26. Oppositely directed pawls 20 and 20a are carried one on each of the gears 8 and 8a and engage in ratchet wheels 9 and 9a with oppositely directed teeth and keyed on the shaft 10, so that as the float 3 rises the gears 8 and 8a will be rotated, the gear 8 imparting a rotary movement to the ratchet wheel 9 through the intermediary of its pawl 20 whereas the pawl 20a of the gear 8a will merely slide over the teeth of the ratchet wheel 9a. When the float 3 descends the gears 8 and 8a will again be rotated but in the opposite direction and in this instance the gear 8a will rotate the ratchet wheel through the intermediary of its pawl 20a, whereas the pawl 20 will merely slide over the teeth of its ratchet wheel 9. As the gears 8 and 8a are keyed on the shaft 10 and the pawls act on the ratchet wheels from opposite sides this shaft will be rotated in the same direction during the ascending and descending movement of the float 3. A pulley or wheel 11 (Fig. III) is keyed on the shaft 10 for utilizing its rotary movement.

The industrial device must be installed at the water's edge on a shore having a natural or artificial steep cliff-like formation, so that the appliance itself is not exposed to storms. For each group of industrial equipment, a rectangular opening must be made in the cliff in the same manner as sewers or culverts, this rectangular culvert leading into the vertical chamber 1 of the appliance in which the float is suspended with its accessories. The opening, as mentioned above, is in the shape of a truncated cone, the outside mouth having three times the area of the inside, that is to say the area at the point of union with the hydraulic chamber 1 as can be seen in the Figs. I, II and III. The level of the entire device should be such that at lowest water level or tide the float barely remains afloat.

The chamber 1, which is an integral part of the appliance, and in which the float 3 and energy collecting parts are installed, may be constructed of metal as shown in Fig. II, of reinforced concrete or sheet metal, this depending on the size of the unit, its location and the particular conditions affecting construction or power transmission.

The culvert connecting the vertical chamber 1 with the sea, may be of any length, although it is best to have it as short as possible, so that the flow may immediately make the column of water ascend, the effects being transmitted to the float, and also those which result in the descent of the float, the accumulated water being dislodged with the greatest rapidity when the sea returns to its lowest level.

The apparatus works as follows:—

Wherever there are cliffs, waves will break against them at a set level or increase in height, equivalent to a sudden fall described as X inches, giving a capacity of X gallons per second, all movement being in proportion to the rise and fall of the waves, always variable but always useful, and their force can be captured and transformed into energy by this device.

Once the apparatus has been constructed, and placed in communication with the sea by means of the culvert 2 whose level is related with that of the sea bed in the immediate vicinity of the cliffs, the sea water naturally penetrates into this culvert 2 even when it is at its lowest level, and reaches the chamber 1 so that the float 3, when the water is at its lowest level, may be partly submerged in relation to its displacement and weight.

When the outside water level rises, the first phenomenon observed is that the water level inside the hydraulic chamber will be much higher than that obtained at the outside of the admission opening, because, due to the flow which takes place, a big quantity of water enters the culvert, so as this culvert becomes narrower, the level of the water which has entered becomes higher than the level of the water outside, and the float 3 is lifted higher than it would be if it were subjected only to the wave movement existing outside. Therefore already at this juncture a greater amount of energy is captured for the above mentioned reason of the greater increase of level in the inside of the apparatus or appliance.

The lift of the float 3 transmits power through the racks 7 and 7a to the gears 8 and 8a, and in turn through the pawls 20, 20a and ratchet wheels 9 and 9a to the shaft 10 (Figs. II, III and V) at one of the ends of which there is a pulley or wheel 11 which transmits the power alternatively and in the same direction to electric current generators which will transport it to the points where it may be required for industrial purposes, or it may be directly connected with the machinery which may have to function close to the place where the energy is captured.

The downward thrust of the float 3 is made use of in exactly the same manner as the upward, and when it descends it derives its energy not only from its weight together with the racks and accessories, but also from the weight of the water accumulated above it and held in place by means of the hinged fan valves 6 arranged laterally on the upper side of the float and which are swung upwards as the float rises, and swing downwards automatically due to the weight of the accumulated water as it descends (Figs. II and VI) and thus the total weight of the float is increased due to the extra weight of the water until it reaches point 12 of the hydraulic chamber 1 (Figs. II and VI) and as the chamber has a greater section or area in the rest of the travel of the plunger the water is automatically dislodged.

Due to the important arrangement of the hinged fan valves on the float when they swing down, they also close the circular space between the float and the chamber, and when the float descends it is converted into a kind of piston driven down by the suction produced by the flow or drop in level, so that when the float descends with its respective racks, three sources of power are created, and they combine advantageously. They are:—

1. The weight of the float, racks and accessories.
2. The weight of the water that is collected in more or less quantity on the top of the float when it rises.
3. The suction produced by the withdrawal or drop in the level of the sea.

All this constitutes, as mentioned above, a force which drives the float down with as much or sometimes more energy than when it rose.

By all the foregoing it is demonstrated that my invention has a double effect, and this has never been achieved in any other apparatus of this kind which has been constructed.

In Figs. VI and VII is shown partially in section the chamber and the float with its fan valves so as to graphically illustrate the working of the same in the periods of ascent and descent. It will be observed that in Fig. VI the valve 6 is lowered in the position shown in full lines and raised at the dotted line position, and respectively in Fig. VII the same valve is lowered in the position shown in dotted lines and raised in the position shown in full lines. In the first case (Fig. VI) the relation between the chamber and the float is depicted when this latter is at the end of its descent, and in the second case (Fig. VII) the relation between the chamber and the float is depicted when this latter is at the end of its ascent. With this definition it will be easy to clearly understand the working of the hinged fan valves 6 on the float.

The power conversion capacity depends entirely on the size of the float, the hydraulic chamber, and other component parts.

The appliance illustrated in Figs. I, II and III is drawn to a scale corresponding to a float having a displacement of about two cubic yards, so therefore its sides would measure 1,260 metres.

According to the principles of Archimedes, while rising, the float loses weight equivalent to that of the liquid which it displaces. Its upward stroke therefore produces energy in foot pounds equivalent to the weight of the water displaced multiplied by the height travelled in one second. The force of the upward stroke will be proportionately great as the depth to which the float is submerged, as a greater displacement of water then occurs.

When the ascent has finished, the descent immediately starts, this descent being produced by the weight of the float 3 with its racks 7, 7a, the weight of which would be insufficient to overcome the accumulated organic resistance opposed to it, but as this weight has added to it that of the water collected on the float and the suction produced by the withdrawal of the water, the result is that, as mentioned above, the descent sometimes occurs with as much or more force than the ascent, an accumulation of energy being produced in both cases, and thus my apparatus can be said to have a double useful effect.

In order that the device and its workings be properly protected against damage by rough sea weather, each apparatus or equipment is provided with bumpers or shock absorbers 13, which project from the under side of the partition in the top of the chamber (Fig. II) and are adapted to limit the travel of the float in its ascent. In the bottom of the hydraulic chamber an iron beam 14 is arranged guided at its ends and supported by two springs 16, so that when the float comes down and comes in contact with the beam, the shock will be absorbed by these springs. Further, in order to lessen still more the shock of the impact of the float with the beam, on the bottom of the float and in line with the beam there will be a rubber bumper 15 which will complete the absorption of the shock.

I claim:—

1. Apparatus to use the energy of sea waves as motive power, comprising in combination a horizontal rectangular culvert communicating with the sea and narrowing towards the end remote from the sea, a vertical chamber in the shape of a truncated cone extending from and connecting with the end of said culvert remote from the sea, a float in said chamber adapted to ascend and descend in said chamber, means for converting the ascending and descending movement of said float into rotary movement, valves hingedly mounted on the upper side of said float adapted to swing upwards under the action of the water rising in said chamber, and allow the water to pass on to the upper side of said float to weight the float and to swing down and close the gap between said float and the wall of said chamber, and imprison the water on the top of said float so that the descent of said float as the water recedes from said chamber is caused by the weight of said float, the water on the top thereof, and suction exerted on the under side of said float and said valves by the water in passing out of said chamber, 2. Apparatus as specified in claim 1, comprising in combination with the chamber and the float, a partition dividing said chamber into two superposed compartments, the lower of said compartments accommodating said float, two racks arranged in different vertical planes projecting upwards from the upper side of said float through said partition into the upper of said compartments and adapted to ascend and descend with said float, a driving shaft in said upper compartment, two gears loosely mounted on said shaft each meshing with one of said racks and adapted to be rotated by the up and down movement of said racks, two ratchet wheels with oppositely directed teeth keyed on said shaft one adjacent each of said gears, and two pawls one carried by each of said gears and each engaging one of said ratchet wheels, said pawls adapted to impart a rotary movement to said shafts through the intermediary of said ratchet wheels.

3. An apparatus as specified in claim 1, comprising in combination with the chamber and the float, a partition dividing said chamber into two superposed compartments, shock absorbers projecting from the under side of said partition adapted to limit the upward movement of said float, and a shock absorber arranged in the lower end of said chamber and including a transverse beam supported on springs, and a bumper on the under side of said float adapted to come into contact with said beam and limit the downward movement of said float.

ALBERTO PUIGJANER.